(12) United States Patent
Lai (10) Patent No.: US 7,055,977 B2
(45) Date of Patent: Jun. 6, 2006

(54) COOLING DEVICE WITH LIGHT CONTROL STRUCTURE

(75) Inventor: Chen Hui Lai, 12F-7, No. 77 Hsin Tai Wu Rd., Sec. 1, His Chih, Taipei Hsien (TW)

(73) Assignees: Power Cooler Enterprise Co., LTD, Taipei Hsien (TW); Chen Hui Lai, Taipei Hsien (TW)

( * ) Notice: Subject to any disclaimer, the term of this patent is extended or adjusted under 35 U.S.C. 154(b) by 0 days.

(21) Appl. No.: 10/911,715

(22) Filed: Aug. 5, 2004

(65) Prior Publication Data

US 2006/0028823 A1 Feb. 9, 2006

(51) Int. Cl.
*F21V 33/00* (2006.01)

(52) U.S. Cl. ............................... 362/96; 362/253; 416/5
(58) Field of Classification Search .................. 362/96, 362/253, 391, 404; 416/5

See application file for complete search history.

(56) References Cited

U.S. PATENT DOCUMENTS

| 5,302,083 | A  | * | 4/1994  | Bucher et al. | 416/5     |
| 6,375,440 | B1 | * | 4/2002  | Kosugi        | 417/423.14 |
| 6,494,589 | B1 | * | 12/2002 | Shyu          | 362/96    |

* cited by examiner

Primary Examiner—Thomas M. Sember
(74) Attorney, Agent, or Firm—Birch, Stewart, Kolasch & Birch, LLP (57) ABSTRACT

A light control structure for a cooling device comprises a hollow frame disposed with a fixing seat connected and fixed at the center of the frame through a plurality of groove strips, at least one lamp inlayed in at least one corner of the frame, a fan pivotally connected onto said fixing seat of the frame and a control circuit installed on the surface of the fixing seat for driving the fan to rotate. Whereby, wires connected with the lamps inlayed in the groove strips are allowed to connect respectively with a control circuit board disposed on the fixing seat by burying and fixing them in the groove strips. The exposition of the flexible wires of the cooling device on the surface of the frame can be prevented so as to allow the wires to be able to be commonly used in all kinds of sizes of frames.

8 Claims, 8 Drawing Sheets

Fig. 8

COOLING DEVICE WITH LIGHT CONTROL STRUCTURE

BACKGROUND OF THE INVENTION

1. Field of the Invention

The present invention relates to a cooling device with light control structure, and more particularly to a cooling device with a structure for hiding wires and lamps effectively and increasing sight effect and safety.

2. Description of Related Art

When the processing ability of a computer mainframe is more outstanding, temperature yielded therein also relatively high. Therefore, a highly efficient cooling device must be installed in a computer housing or CPU to lower the high temperature effectively in the computer mainframe down to an operating temperature that the electronic parts can endure so as to protect the corresponding electronic parts in the CPU of the mainframe to allow the mainframe to maintain at a normal operation state and reduce the damage of the electronic parts or possibility of crash.

But, the outlook of the cooling device is monotonous without any novelty variation up to nowadays so that it can not meet with youths' fashion desire. Therefore, a light emitting cooling device, which many kinds of lights can be turned on at the same time when the fan of the cooling device is rotated, was developed. Such kind of the cooling device with artistic outlook attracts more youths to purchase it.

Figure 1:
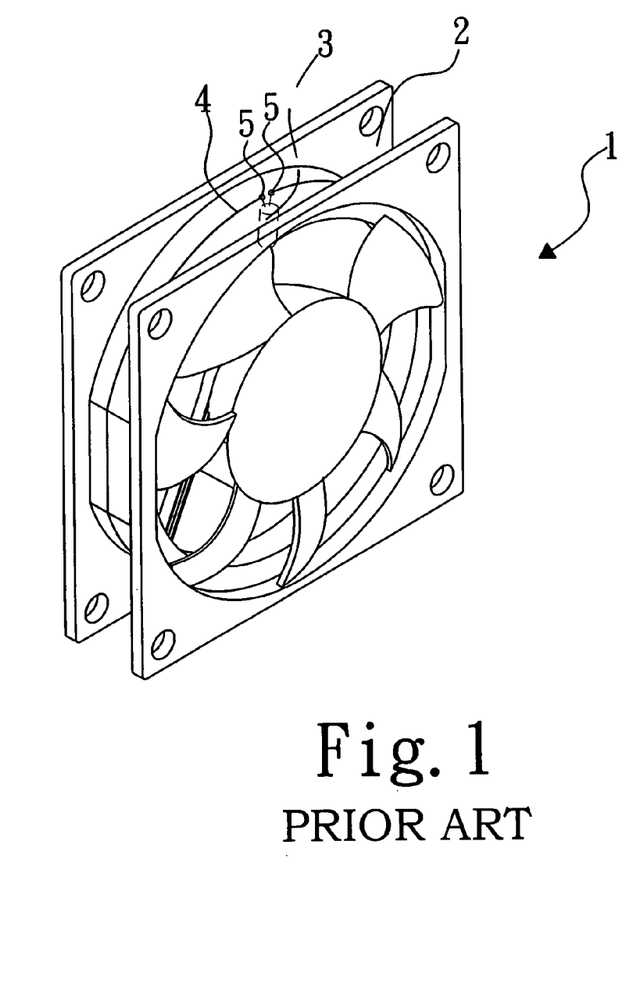
FIG. 1 is a prospective view, showing a cooling device of the prior art.

As FIG. 1 shows, a light emitting cooling device structure habitually used in the industry is a structure mainly passing light emitting devices 3 through a hole in a frame 2 of the cooling device 1, the light emitting devices being then connected together through a wire 4 and the flexible wire being wound around the surface of the frame 2. The shortcomings of the device mentioned above are as the followings:

1. because the wire 4 is covered and exposed on the surface of the frame 2, if the size of the frame 2 is changed, the wire 4 must also be changed to match with the size of the frame 2, this will cause embarrassment on assembly and extra production cost.
2. Because the wire is exposed on the surface of the frame 2 and the welding points 5 of the wire 4 and the light emitting devices are also exposed on the surface of the frame 2, the danger caused from the bad insulation is easily incurred, and the possibility of short circuit might further caused; the safety of users and facilities is worried.
3. the light emitting devices of the cooling device continue to be lighted accompanying the rotation of the fan without an apparatus disposed in the cooling device 1 to control brightness of the light emitting device, i.e. the light emitting device cannot be turned on or off depending on a practical need. The waste of electricity will be caused under the long term use of the cooling device 1.

The present invention is proposed to solve the shortcomings mentioned above to match the wire or a control circuitry with any size of frame and further to have both of practicability and insulation.

SUMMARY OF THE INVENTION

The present invention provides a cooling device with a light control structure, mainly comprising a hollow frame, fan mechanism and control circuit board. A fixing seat is disposed at the center of the hollow frame and a plurality of groove strips connected with a through holes opened wall face of the hollow frame are extended from the circumference of the fixing seat so as to allow the fixing seat to be fixed in the frame. Furthermore, the control circuit board is fixed and the fan mechanism is pivotally disposed on the surface of the fixing seat and at least one lamp is inlayed in at least one corner of the frame.

A notch, which is a cross type notch constituted by a longitudinal notch and transversal notch, is disposed in at least one corner of a frame in a lamp control structure for a cooling device according to the present invention and the cross type notch is communicated with the groove strip mentioned above. Furthermore, wires connected with the lamps inlayed in the groove strips are allowed to connect respectively with a control circuit board disposed on the fixing seat by burying and fixing them in the groove strips. Whereby, the exposition of the flexible wires of the cooling device on the surface of the frame can be prevented so as to allow the wires to be able to be commonly used in all kinds of sizes of frames.

A corresponding shape of mass piece can be inlayed in a wall of cross type notch inlayed with a lamp in a light control structure according to the present invention so as to fix the lamp in the notch to prevent the lamp from moving or exposing on the outer surface of the frame while transporting or assembling.

A welding point of a lamp inlayed in cross type notch and a wire in a light control structure according to the present invention can be allowed to hide in the cross type notch or groove strip through the structure communicating the cross type notch with the groove strip. The bad insulation caused from the exposition of the welding point of the wire of the conventional cooling device on the surface of the frame and the easy damage of the lamp caused from an external force can be further preventd.

A light control circuit in a light control structure of a cooling device according to the present invention further comprises a voice controlled circuit. The lamps disposed at the corners of the frame are respectively connected to the voice controlled circuit through the groove strips and can be lighted on and flash can be yielded by actuating the voice controlled circuit with external voices. Thereby, the lamp in the cooling device can be controlled to have rhythmic flashes or turn off depending on a user's need so as to save electric power effectively and increase amusement in use.

A voice picker of a voice controlled circuit in a lamp control structure for a cooling device according to the present invention can be directly disposed in a circuit board or chosen to dispose at a place with a good voice receiving through a wire.

The frame mentioned above is made from a transparent of semi-transparent material so as to increase sight effect performed by the cooling device.

A lamp capable of emitting different kinds of colors can be adopted for the lamp disposed at the corner of the frame mentioned above so as to increase the sight effect performed by the cooling device.

BRIEF DESCRIPTION OF THE DRAWINGS

The present invention can be more fully understood by reference to the following description and accompanying drawings, in which:

FIG. 7 is a circuit diagram, showing a circuitry with a voice controlled circuit in a light control structure for a cooling device according to the present invention.

DETAILED DESCRIPTION OF THE
PREFERRED EMBODIMENTS

Figure 2:
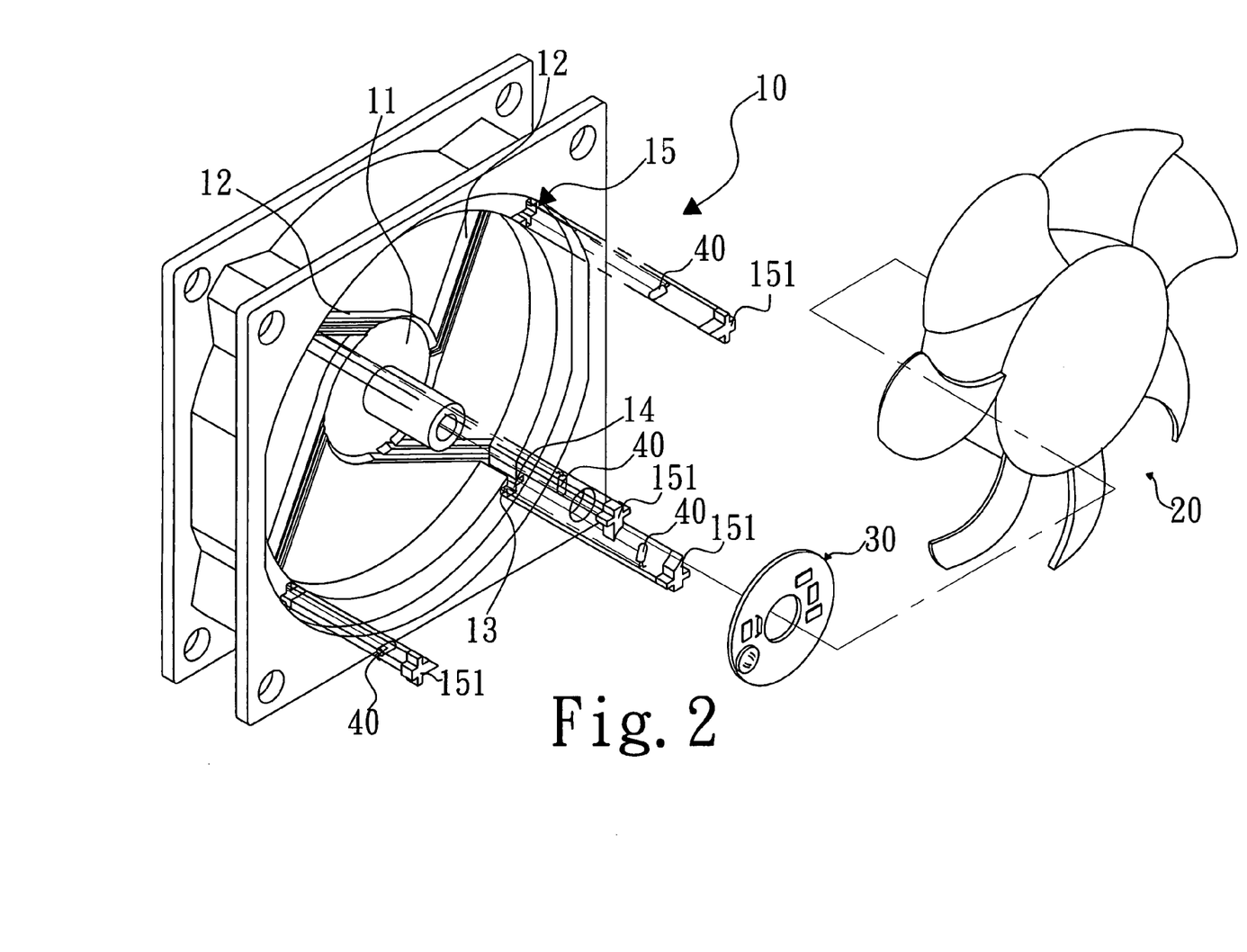
FIG. 2 is an explosive view, showing a light control structure for a cooling device of a preferred embodiment according to the present invention.

Please refer to FIG. 2. FIG. 2 is an explosive view showing a cooling device with a lamp control structure according to the present invention. A lamp control structure for a cooling device mainly comprises a hollow frame 10, fan mechanism 20 and control circuit board 30, in which a fixing seat 11 is disposed at the center of the hollow frame 10. Four groove strips 12 with a or several groove(s) in each of them connected respectively with the inner wall of the frame 10 and capable of burying wires in each of them are respectively extended from the circumference of the fixing seat 11 to allow the fixing seat 11 to fix in the frame 10. The control circuit board 30 is fixed and the fan mechanism 20 is pivotally disposed on the surface of the fixing seat 11. A magnetic coil (not shown in the figure) is engaged with the inner rim at the center of the fan mechanism 20, which is driven by the control circuit board 30 to drive further the fan mechanism 20 to rotate. A cross type notch 15 constituted by transversal and longitudinal notches 13 and 14 is opened at each one of four corners of the frame 10 to allow the lamp 40 to be placed on the bottom of the cross type notch 15 and a corresponding shape of cross type mass piece 151 is then inlayed in the cross type notch 15 on the top of the lamp 40.

Figure 3:
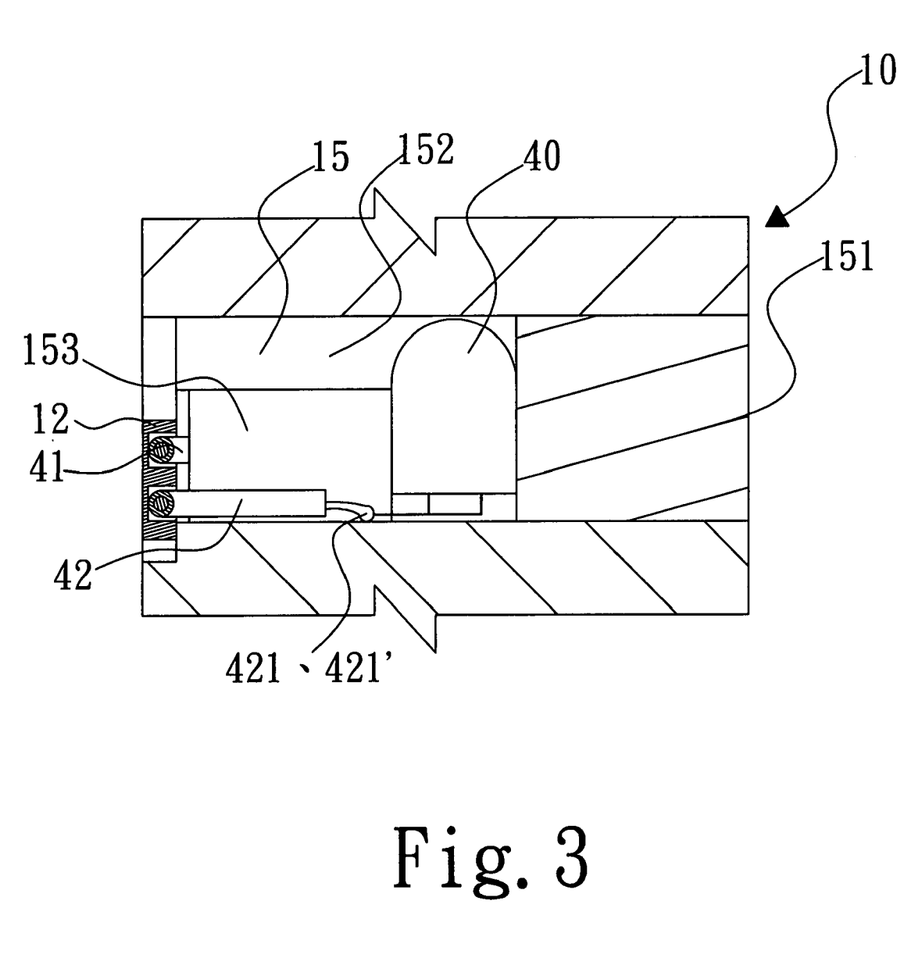
FIG. 3 is a cross sectional view, showing a cross type notch in a light control structure for a cooling device of a preferred embodiment according to the present invention.

Please refer to FIG. 3. FIG. 3 is a schematic cross-sectional view showing a cross type notch of a lamp control structure for a cooling device according to the present invention the inner end of each cross type notch 15 disposed at the corner of the frame 10 is communicated with the groove strip 12 and a long partition plate 153 is installed in a space 152 inside the cross shape notch 15; the partition plate is used to hold and fix the lamp 40 placed in the cross type notch between it and the corresponding cross mass piece 151 after the cross mass piece with a shape corresponding to the cross type notch is pushed into the cross notch to allow the lamp to be kept maintaining fixing the lamp 40 at the middle section of the cross type notch to prevent further the lamp 40 from exposing to the outer surface of the frame 10 while transporting or assembling.

Figure 4:
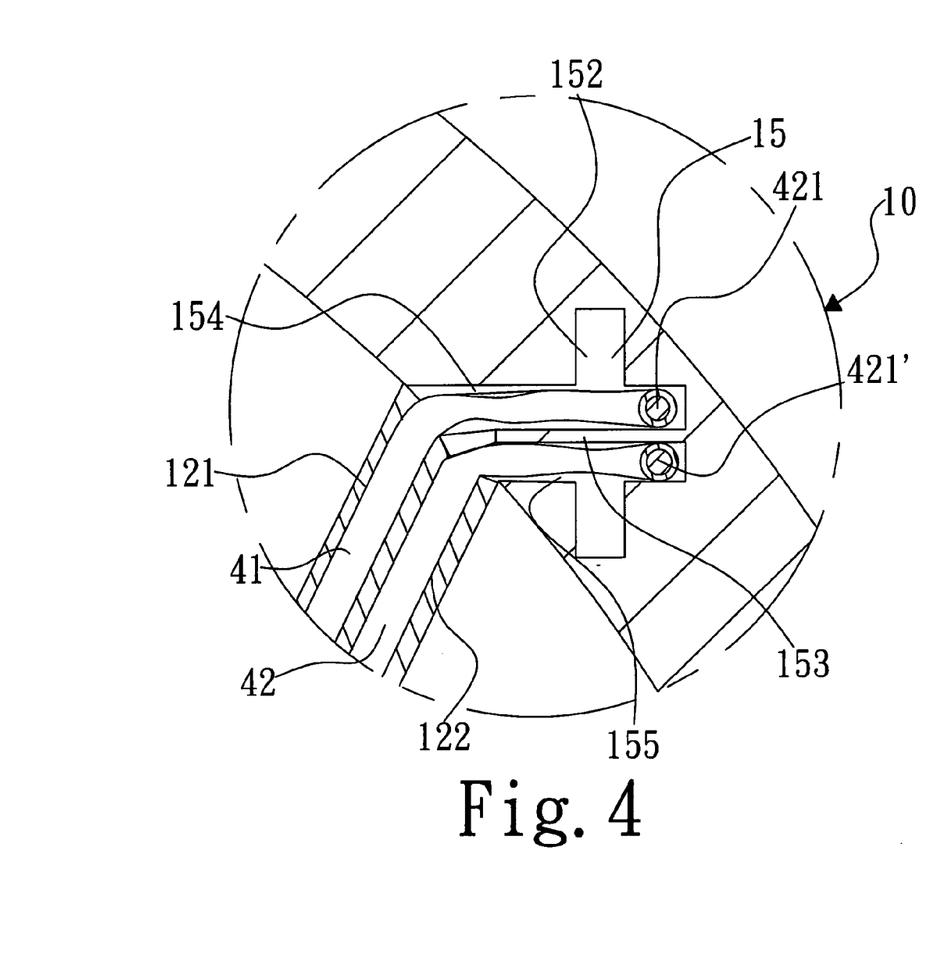
FIG. 4 is another cross sectional view, showing a cross type notch in a light control structure for a cooling device of a preferred embodiment according to the present invention.

FIG. 4 is another cross-sectional schematic view showing a cross type notch in a light control structure for cooling device according to the present invention. Another function of a partition plate 153 is to separate the space in the cross type notch 15 into left and right insulation spaces 154 and 155 to allow welding points 421 and 421' at which the lower ends of the lamp 40 are respectively connected with positive and negative poles of wires 41 and 42 to be insulated respectively in the left and the right insulation spaces 154 separated by the partition plate 153. Therefore, the positive and the negative poles of the wires 41 and 42 can be prevented from being touched accidentally to yield a short circuit phenomenon while transporting or assembling.

Figure 5:
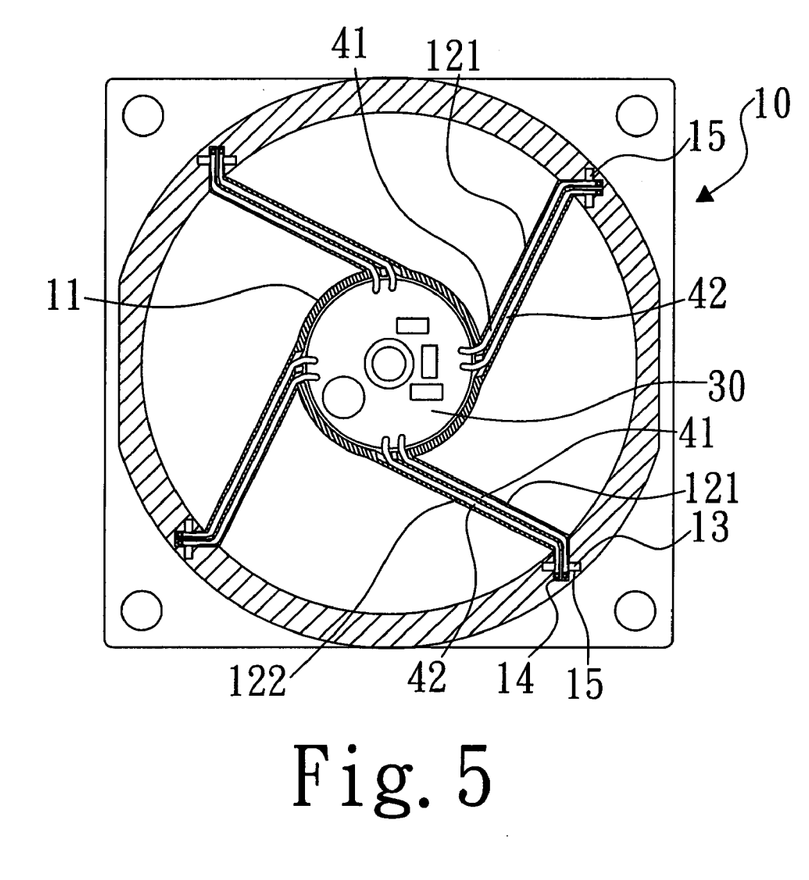
FIG. 5 is a cross sectional view, showing a frame of a light control structure for a cooling device of a preferred embodiment according to the present invention.

Please refer to FIG. 5. FIG. 5 is a cross-sectional schematic view showing a frame in a light control structure for a cooling device according to the present invention. The inner end of the cross shape notch 15 in the light control structure for a cooling device is communicated with the grooves in the groove strip 12, the positive and negative wires 41 and 42 connected with the lamp 40 can be gone along with the internal end of the cross type notch 15 and buried and fixed respectively in the grooves 121 and 122 in the groove strip 12 to connect further with the control circuit board 30 on the fixing seat 11 at the center of the frame 10 to allow the lamp to be lighted on the lamp at the same time when the control circuit board 30 drives the fan mechanism 20 to rotate. Whereby, the wires in the whole cooling device can be buried effectively, the safety of assembly and maintenance influenced by a disorder wires arrangement can be prevented and the visual artistic appearance can be maintained.

Figure 6:
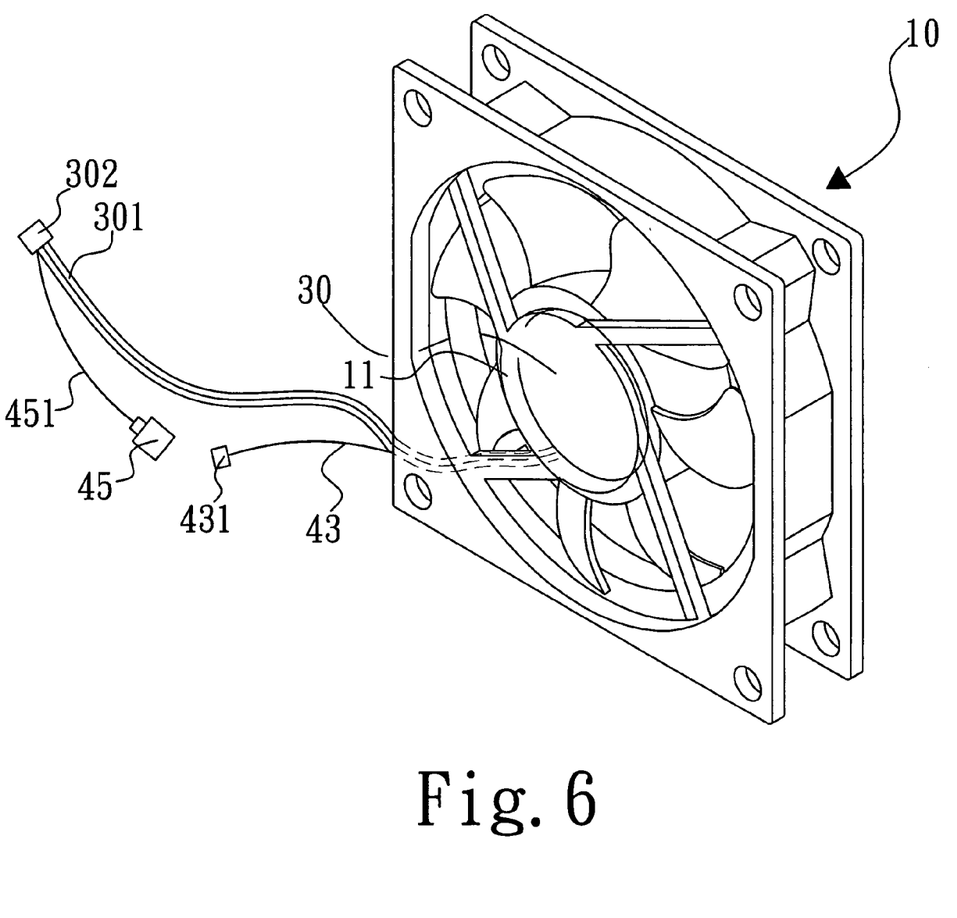
FIG. 6 is a prospective view, showing a light control structure for a cooling device of another preferred embodiment according to the present invention.
Figure 7:
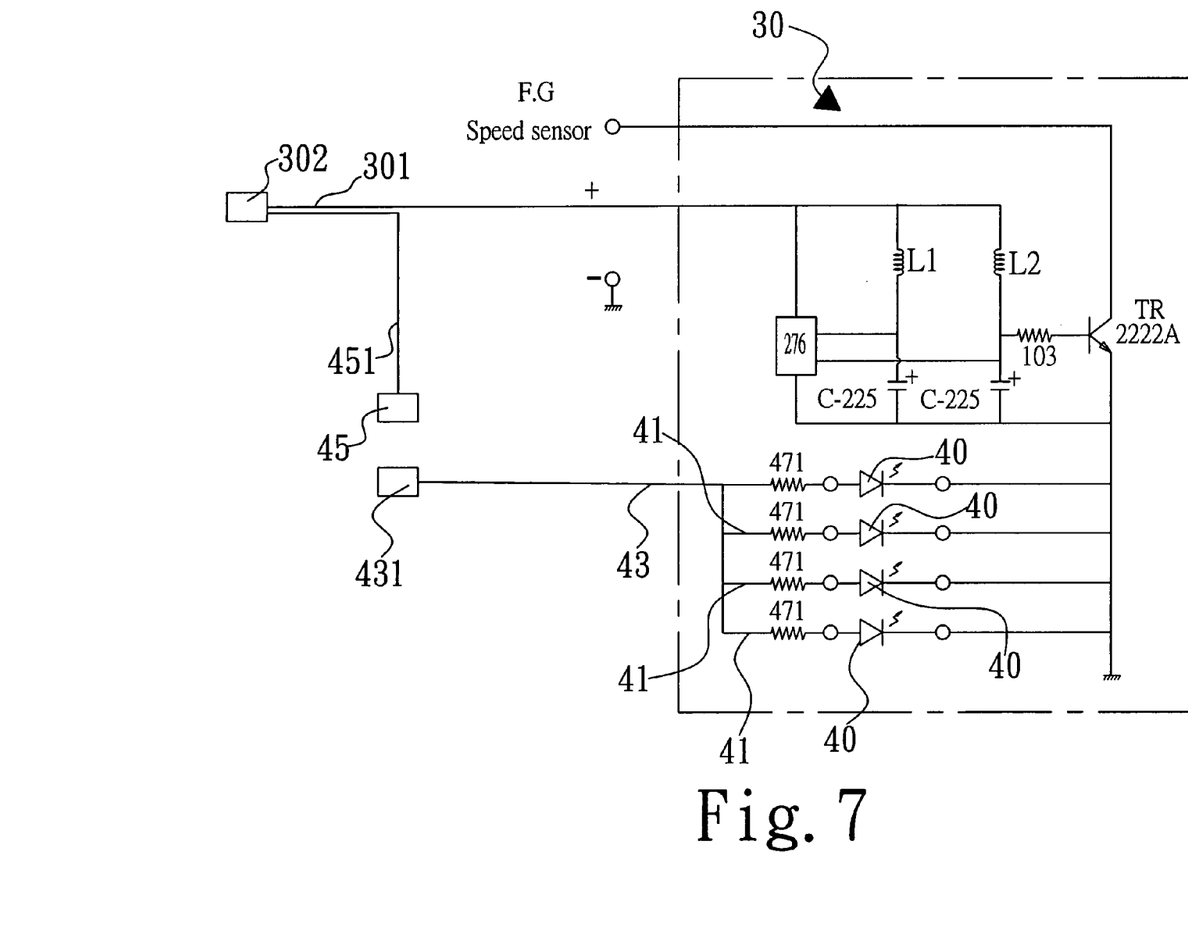
FIG. 7 is a circuit diagram, showing a circuit in a light control structure for a cooling device according to the present invention.

Please refer to FIGS. 6 and 7. FIGS. 6 and 7 are respectively a prospective view and circuit diagram showing a cooling device with a light control structure of another preferred embodiment according to the present invention. The light control structure for the cooling device according to the present invention is mainly used to drive the cooling device to cool down a mainframe of a computer effectively when the mainframe is in operation. The control circuit board 30 is connected to a outlet 302 through a wire 301, which is used to insert into the plug 43 (not shown in the figure) of a power supply of the computer mainframe for supplying the power needed for the circuit board 30 of the cooling device. After the positive wires 41 respectively connected to the lamps 40 disposed in the cross type notches 15 at the four corners of the frame 10 are connected in parallel and extended to connect a wire 43, the wire 43 is then connected to a independent single plug 431. Furthermore, a wire 451 connected to a single outlet 45 is extended from the outlet 302. The turning on and off of the lamps are all controlled by whether the single plug 431 is inserted in the single outlet 45. When a user wants to turn on the lamp 40, he can insert the single plug 431 into the single outlet 45 to turn the lamp 40 on when the cooling device is driven to rotate. And vice versa, when the light is not needed, the single plug 431 is simply plugged out of the single outlet 45 to cut off the positive voltage power supply so as to turn off the lamp 40. Therefore, a user can choose to turn on or off the lamps 40 depending on his personal need so as to save electricity and lower the burden of the power supply.

Figure 8:
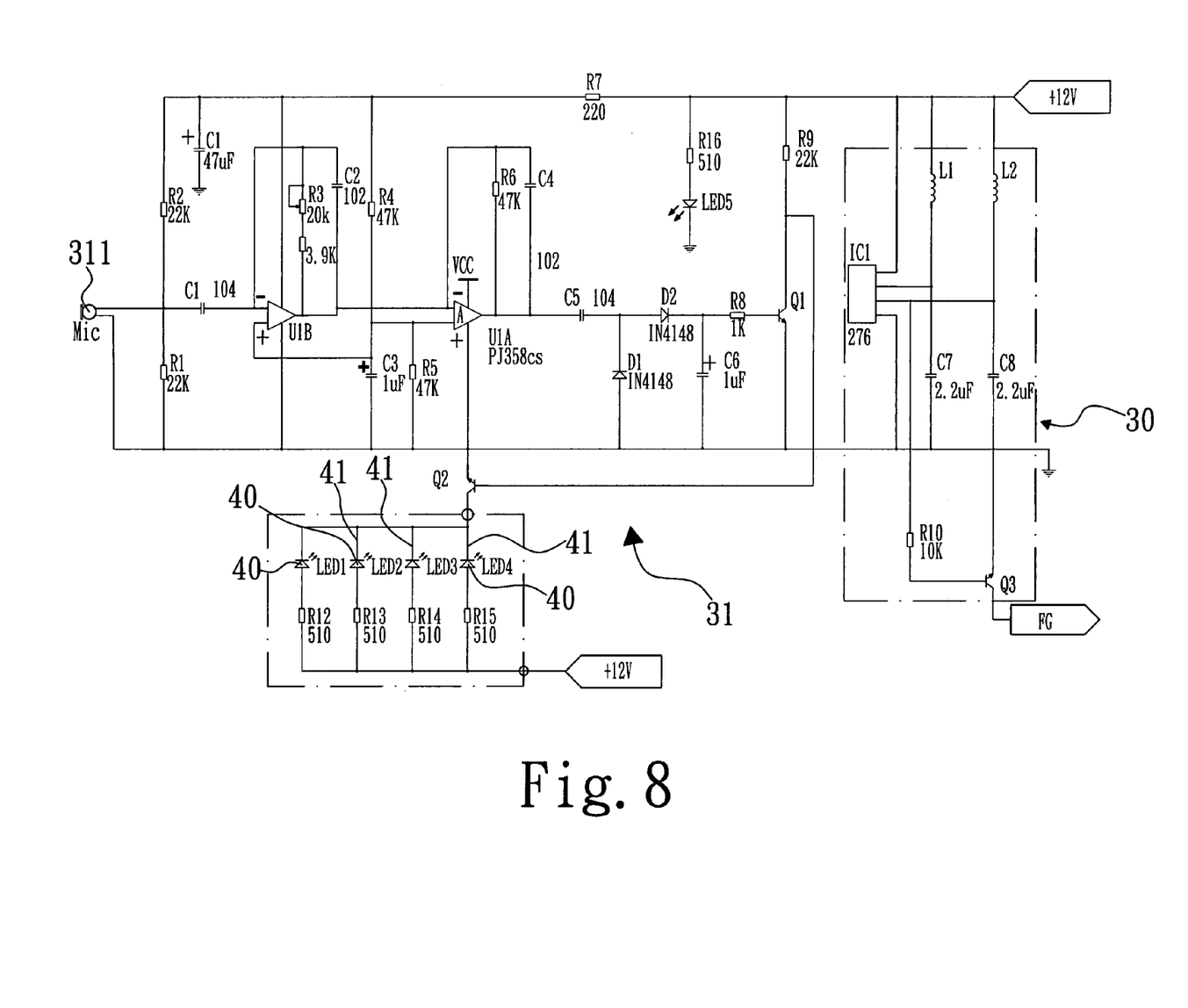

Please refer to FIG. 8. FIG. 8 is a circuit diagram showing a circuitry with voice controlled circuit in a cooling device with a light control structure according to the present invention. The circuit board 30 further comprises a voice controlled circuit 31 used to control and adjust the lamps 40 to emit rhythmic flashes in the cooling device or turn off the lamps 40. Similarly, the positive wires of the lamps 40 in the frame 10 are connected in parallel and then connected with a voice controlled circuit 31 an external voice is picked up by a voice picker 311 (e.g. microphone) connected to the voice controlled circuit 311 to actuate the voice controlled circuit 31 to conduct and light up the lamp 40. Thereby, a user can control the flashes of the lamps 40 in the cooling device and close the lamp 40 by a voice depending on his practical need.

It is noted that the cooling device with a light control structure described above is the preferred embodiments of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A cooling device light with a control structure, comprising:

a hollow frame, disposed with a fixing seat at the center thereof, said fixing seat being connected and fixed at the center of said frame through a plurality of groove strips;

at least one lamp, inlayed in at least one corner of said frame;

a fan, pivotally connected onto said fixing seat of said frame; and a control circuit board, installed on the surface of said fixing seat for driving said fan to rotate;

Positive and negative wires connected with said lamp installed in the corner of said frame being buried in said groove strip so that said positive and negative wires are hidden in said groove strip and connected to said driving circuit board.

2. The light control structure according to claim 1, wherein a cross type notch formed by a transversal and longitudinal is opened in each one of at least one corner of said frame for fixing said lamp.

3. The light control structure according to claim 2, wherein a cross type mass piece with a shape corresponding to said notch is inlayed in said cross type notch at the top of said inlayed lamp so as to fix said lamp at a proper location in said notch.

4. The light control structure according to claim 1, wherein said groove strip is communicated with said cross type notch.

5. The light control structure according to claim 1, wherein a wire with a single plug is connected to said positive wires connected in parallel with said lamps and a wire with a single outlet is further extended from a positive pole of a power supply used to drive said circuit board;

whereby, the turning on or off of said lamp can be controlled by plugging said single plug into or out of said single outlet.

6. The light control structure according to claim 1, wherein said frame is made from transparent or semi-transparent material.

7. The light control structure according to claim 1, said control circuit further comprising a voice controlled circuit, said voice controlled circuit being connected to said lamp to control said lamp to emit rhythmic flashes or close said lamp by the means of the detonation of an external voice.

8. The light control structure according to claim 1, wherein poles of said positive and negative wires are separated by a partition plate.

* * * * *